[12] United States Patent
Hu et al.

(10) Patent No.: US 12,444,081 B2
(45) Date of Patent: Oct. 14, 2025

(54) AUTOMATIC UNIFICATION OF CAMERA INTRINSIC MODEL

(71) Applicant: GM Global Technology Operations LLC, Detroit, MI (US)

(72) Inventors: Yao Hu, Sterling Heights, MI (US); Hao Yu, Troy, MI (US); Guanlun He, Ann Arbor, MI (US); Xinyu Du, Oakland Township, MI (US); Binbin Li, Columbus, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 368 days.

(21) Appl. No.: 17/947,550

(22) Filed: Sep. 19, 2022

(65) Prior Publication Data
US 2024/0095954 A1    Mar. 21, 2024

(51) Int. Cl.
*G06T 7/80*     (2017.01)
*G06T 5/80*     (2024.01)
*G06T 15/10*    (2011.01)

(52) U.S. Cl.
CPC .................. *G06T 7/80* (2017.01); *G06T 5/80* (2024.01); *G06T 15/10* (2013.01); *G06T 2207/30268* (2013.01)

(58) Field of Classification Search
CPC .. G06T 7/80; G06T 5/80; G06T 15/10; G06T 2207/30268; H04N 23/81
See application file for complete search history.

(56) References Cited

U.S. PATENT DOCUMENTS

2020/0265211 A1*  8/2020  Nasrabadi ............ G06V 10/764
2022/0222857 A1*  7/2022  Yuan ........................ G06T 7/80
2023/0419680 A1* 12/2023  Parenti ................. G06V 10/774

* cited by examiner

Primary Examiner — Jianxun Yang
(74) Attorney, Agent, or Firm — CANTOR COLBURN LLP

(57) ABSTRACT

A vehicle includes a system performing a method of operating a camera for the vehicle. The camera is configured to capture an image. The processor is configured to query the camera to obtain an intrinsic parameter of the camera, estimate a unified parameter based on the intrinsic parameter of the camera, and perform at least one application on the image using the unified parameter.

20 Claims, 5 Drawing Sheets

AUTOMATIC UNIFICATION OF CAMERA INTRINSIC MODEL

INTRODUCTION

The subject disclosure relates to the use of cameras in the operation of vehicles and, in particular, to a method for determining a set of unified parameters of a unified camera model that can be used across multiple camera models and also for using the set of unified parameters to perform various applications for navigation and automation of the vehicle.

An autonomous vehicle can use a camera to obtain an image of an area within a field of view of a vehicle, thereby allowing the autonomous vehicle to navigate with respect to any objects within the area. Many manufacturers provide cameras for use in a vehicle. Each camera has its own set of intrinsic parameters, such as optical center, focal length, etc. Since, cameras can be removed and replaced for various reasons, each time an application is performed at the vehicle using an image from the camera, the camera and model number needs to be checked so that the correct intrinsic parameters are used. Performing this check each time increases the complexity of the application software and increases run times. Accordingly, it is desirable to provide a set of unified parameters that can be used in applications across multiple cameras and models.

SUMMARY

In one exemplary embodiment, a method of operating a camera for a vehicle is disclosed. The camera is queried to obtain an intrinsic parameter of the camera. A unified parameter is estimated based on the intrinsic parameter of the camera. At least one application is performed on an image from the camera using the unified parameter.

In addition to one or more of the features described herein, the method further includes storing the unified parameter to a memory and performing the same or a different application by retrieving the unified parameter from the memory. Estimating the unified parameter further comprises determining a distortion model for the camera. The method further includes determining the unified parameter from the intrinsic parameter using an analytical calculation. Determining the unified parameter includes projecting a virtual three-dimensional grid of points onto an image plane using the intrinsic parameter to form a first set of projected points in the image plane, projecting the virtual three-dimensional grid of points onto the image plane using the unified parameter to form a second set of projected points in the image plane, and determining a coefficient of the distortion model that reduces a difference between the first set of projected points and the second set of projected points. Determining the coefficient further includes minimizing a cost function between the first set of projected points and the second set of projected points. The virtual three-dimensional grid of points includes a predetermined point and a randomly sampled point.

In another exemplary embodiment, a system for operating a camera of a vehicle is disclosed. The system includes a processor configured to query the camera to obtain an intrinsic parameter of the camera, estimate a unified parameter based on the intrinsic parameter of the camera, and perform at least one application on an image from the camera using the unified parameter.

In addition to one or more of the features described herein, the processor is further configured to store the unified parameter to a memory and retrieve the unified parameter from the memory to perform the same or a different application. The processor is further configured to estimate the unified parameter by determining a distortion model for the camera. The processor is further configured to determine the unified parameter from the intrinsic parameter using an analytical calculation. The processor is further configured to determine the unified parameter by projecting a virtual three-dimensional grid of points onto an image plane using the intrinsic parameter to form a first set of projected points in the image plane, projecting the virtual three-dimensional grid of points onto the image plane using the unified parameter to form a second set of projected points in the image plane, and determining a coefficient of the distortion model that reduces a difference between the first set of projected points and the second set of projected points. The processor is further configured to determine the coefficient by minimizing a cost function between the first set of projected points and the second set of projected points. The virtual three-dimensional grid of points includes a predetermined point and a randomly sampled point.

In yet another exemplary embodiment, a vehicle is disclosed. The vehicle includes a camera and a processor. The camera is configured to capture an image. The processor is configured to query the camera to obtain an intrinsic parameter of the camera, estimate a unified parameter based on the intrinsic parameter of the camera, and perform at least one application on the image using the unified parameter.

In addition to one or more of the features described herein, the vehicle further includes a memory, wherein the processor is further configured to store the unified parameter to the memory and retrieve the unified parameter from the memory to perform the same or a different application. The processor is further configured to estimate the unified parameter from the intrinsic parameter using an analytical calculation. The processor is further configured to determine the unified parameter by projecting a virtual three-dimensional grid of points onto an image plane using the intrinsic parameter to form a first set of projected points in the image plane, projecting the virtual three-dimensional grid of points onto the image plane using the unified parameter to form a second set of projected points in the image plane, and determining a coefficient of the distortion model that reduces a difference between the first set of projected points and the second set of projected points. The processor is further configured to determine the coefficient by minimizing a cost function between the first set of projected points and the second set of projected points. The virtual three-dimensional grid of points includes a predetermined point and a randomly sampled point.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
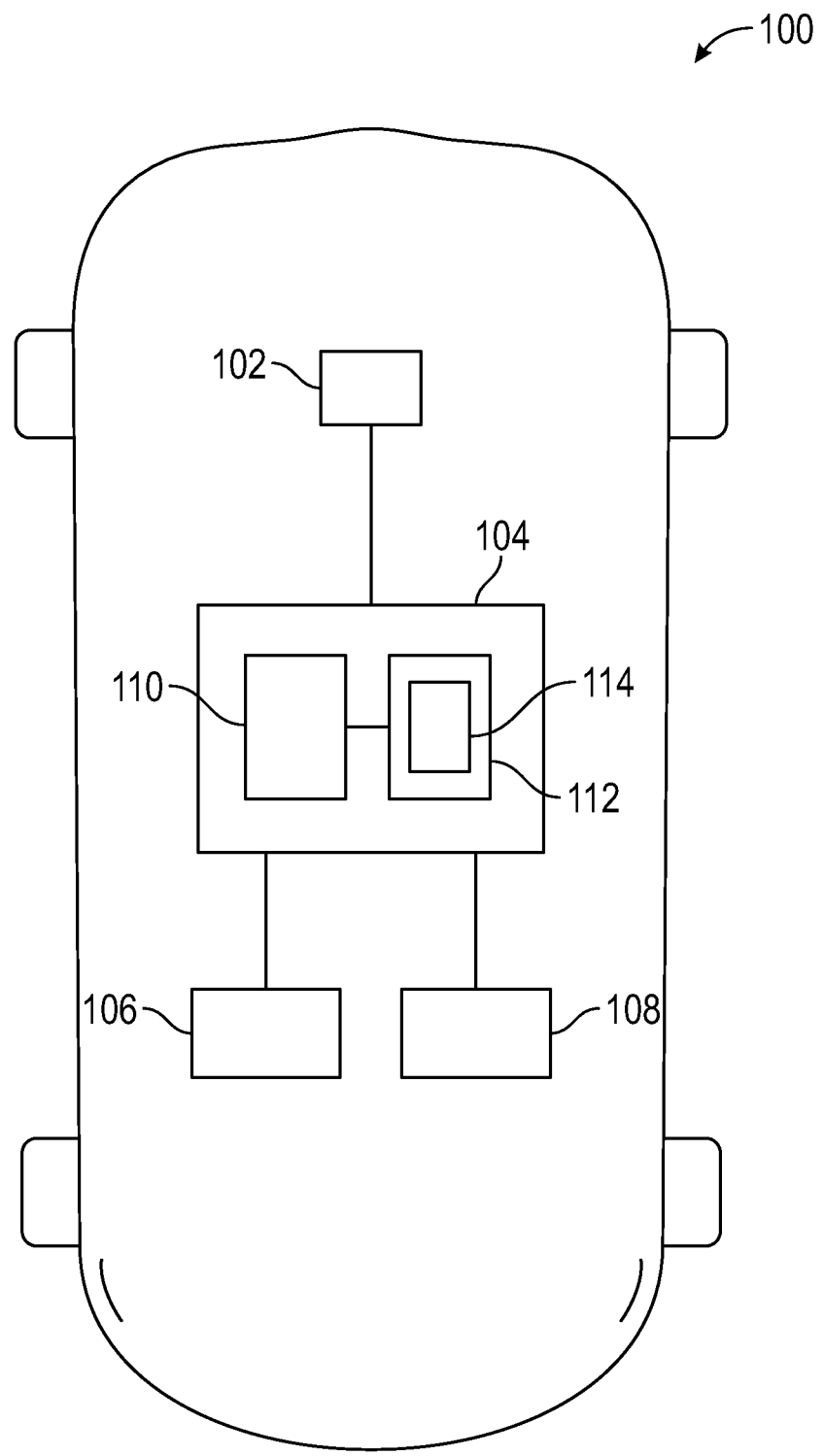
FIG. 1 shows a vehicle in plan view.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 in plan view. The vehicle 100 can be an autonomous vehicle in various embodiments. The vehicle 100 includes a camera 102, a control unit or controller 104, a navigation system 106 and an actuation system 108. The controller 104 may include processing circuitry that may include an application specific integrated circuit (ASIC), an electronic circuit, a processor 110 (shared, dedicated, or group) and memory 112 that executes one or more software or firmware programs 114, a combinational logic circuit, and/or other suitable components that provide the described functionality. The controller 104 may also include a non-transitory computer-readable medium that stores instructions which are processed by one or more processors of the controller to implement processes detailed herein. The navigation system 106 determines a trajectory or behavior of the vehicle 100. In various embodiments, the navigation system 106 can be a program operating on the processor 110. The actuation system 108 includes devices that can be operated or controlled by the controller 104 to move the vehicle 100 along the trajectory, such as a steering device, accelerator, brakes, etc.

In various embodiments, the camera 102 captures an image and sends the image to the controller 104. The controller 104 receives the image and uses the image as input to various applications being run at the processor 110. Exemplary applications include a sensing application, a perception application, localization application, and a mapping application. In a sensing application, the processor 110 uses the image to perform camera alignment and image calibration such as by determining a spatial relation between a camera-centered frame of reference and a vehicle-centered frame of reference. This can involve determining a transformation matrix between these reference frames. In a perception application, the processor 110 detects an object within the image. In a localization application, the processor 110 determines the position of the vehicle 100 with respect to a position of the object within the environment of the vehicle 100. In a mapping application, the processor 110 generates a virtual environment using the image that places a representation of the object at an appropriate location in the virtual environment. This representation of the object can then be used for navigation in subsequent applications.

Figure 2:
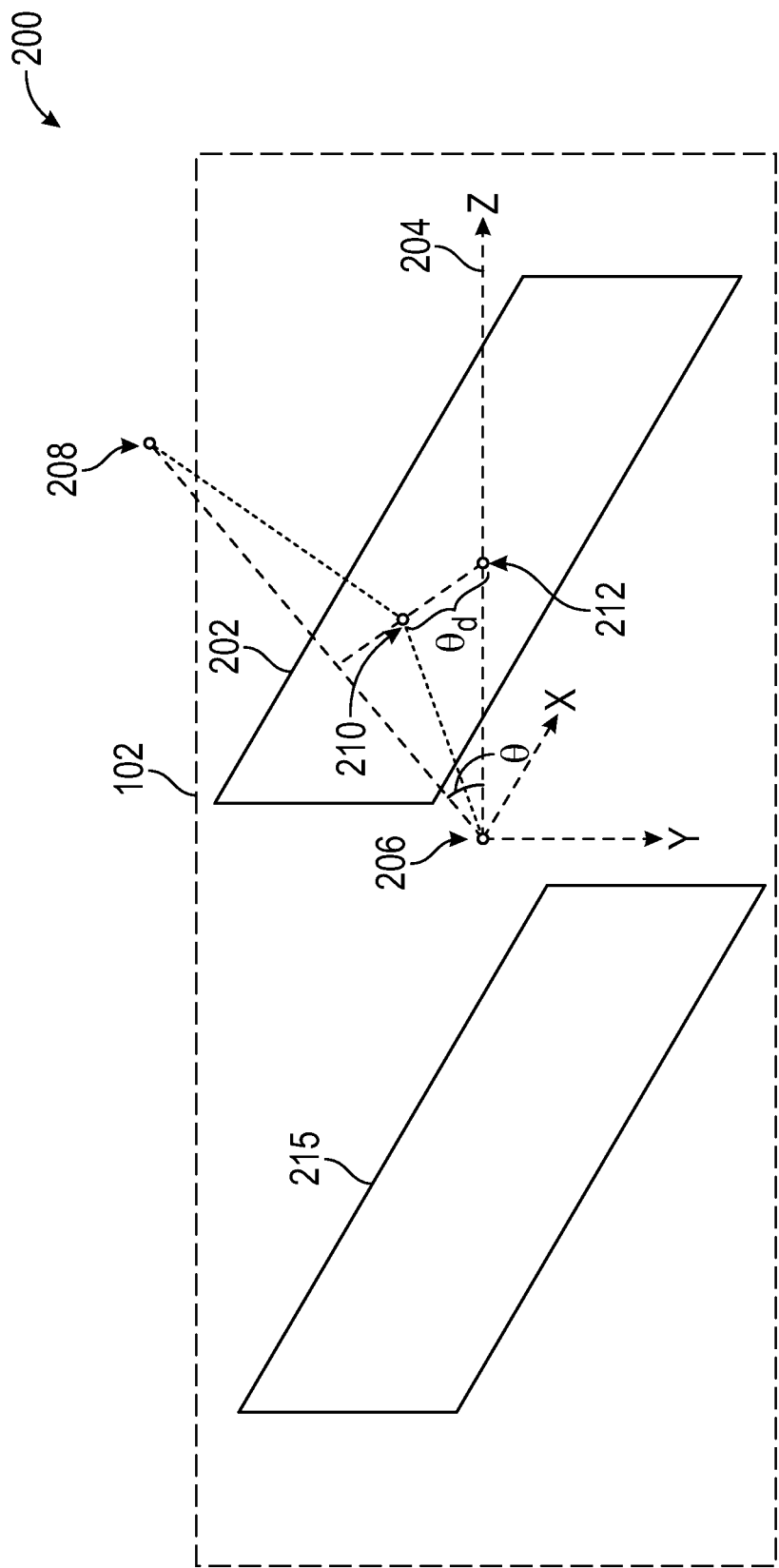
FIG. 2 shows a schematic diagram of a camera of the vehicle illustrating image formation or image capture at the camera.

FIG. 2 shows a schematic diagram 200 of the camera 102 illustrating image formation or image capture at the camera 102. The schematic diagram 200 shows an image plane 202 of the camera 102 at which the image is formed, a principal axis 204 of the image plane 202, and an optical center 206 of the camera 102. A coordinate reference frame of the camera 102 has its origin at the optical center 206 with its z-axis along the principal axis 204. An imaging array for image capture, such as an array of photodetectors, is disposed at a plane 215 at a position in opposition to the image plane 202 with respect to the optical center 206. A three-dimensional point P (3D point 208) is shown for illustrative purposes and a two-dimensional projection point (2D image point 210) related to the 3D point 208 is located in the image plane 202. The 3D point 208 is defined by its spatial coordinates (x, y, z) within the coordinate reference frame of the camera 102. Coordinates $(u', v')^T$ define a location in the image plane to which the 3D point 208 is projected using a distortion model of the camera. The coordinates $(u, v)^T$ define the position of a pixel at which the 2D image point 210 is located in the image plane 202 and is determined from $(u', v')^T$. Angle θ is the angle of the 3D point 208 with respect to the principal axis 204. Distance $θ_d$ is the distance of the 2D image point 210 with respect to the principal axis 204. A principal point 212 indicates an intersection of the image plane 202 with the principal axis 204 and has normalized coordinates (0, 0, 1). The normalized coordinates of the 2D image point 210 are given as (u', v', 1), which can be also written in short-hand a (u', v'). In addition, in alternative embodiments, the original (0, 0) can be defined as a top-left corner of the image.

A matrix transformation that projects the 3D point 208 onto the 2D image point 210 in the image plane 202 of the camera is shown in Eq. (1):

$$\begin{bmatrix} u \\ v \end{bmatrix} = Kg\left(\begin{bmatrix} x \\ y \\ z \end{bmatrix}, D\right) \qquad \text{Eq. (1)}$$

where K is a linear transformation model of the camera and g( . . . ) is a distortion model of the camera that includes a non-linear transformation. The distortion model g( . . . ) is applied to point (x, y, z) to obtain location (u', v', 1) in the image plane. The linear transformation model is then applied to (u', v') to obtain (u, v). The vector D is a set of coefficients of the distortion model. The coefficients are intrinsic parameters of the camera 102 based on the camera model and design. K and g are thus intrinsic to the camera model.

Figure 3:
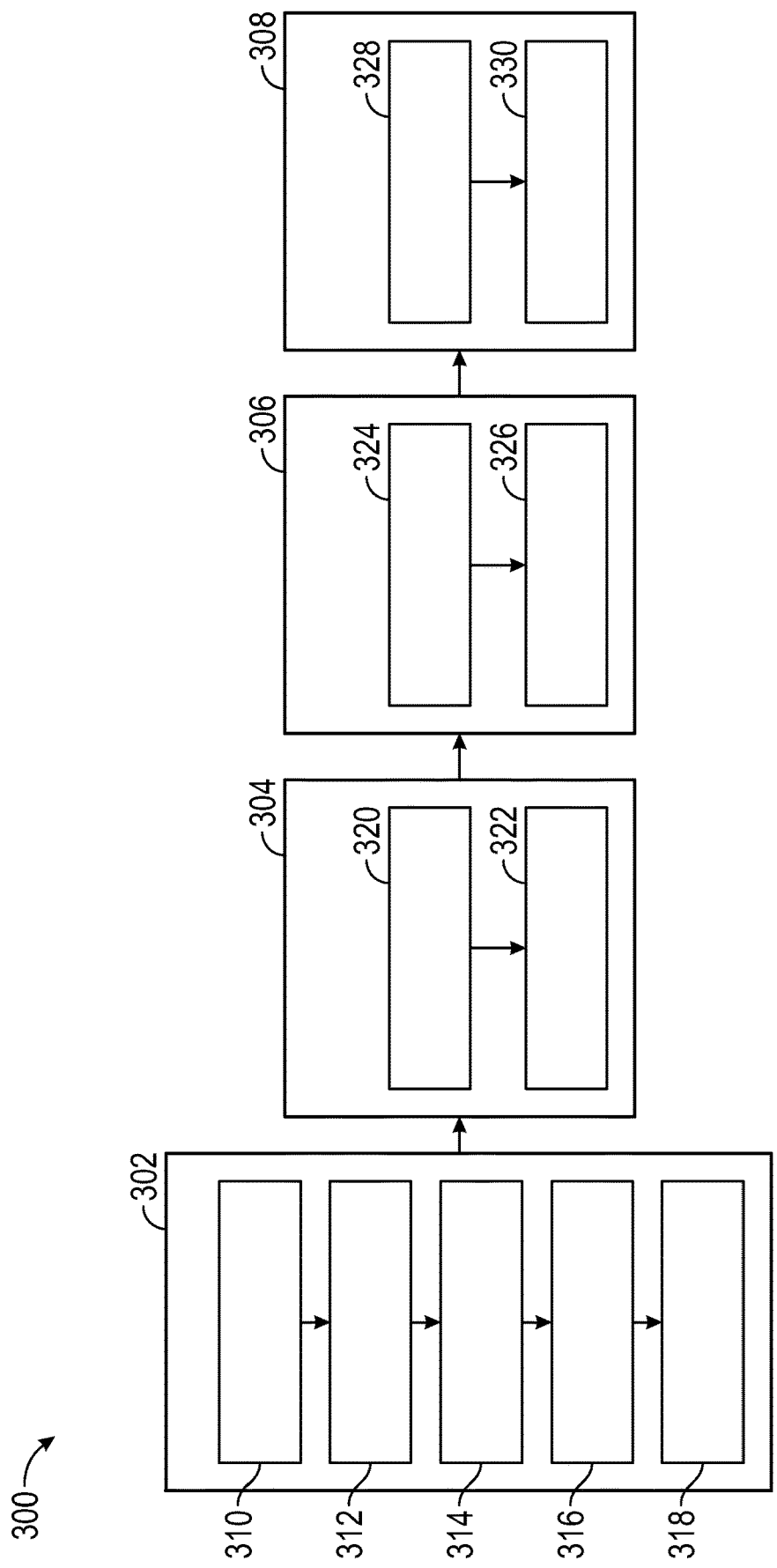
FIG. 3 is a workflow diagram illustrating a sequence of operations in applications used in image processing at the vehicle.

FIG. 3 is a workflow diagram 300 illustrating a sequence of operations in applications used in image processing at the vehicle 100. The workflow includes a first application 302, second application 304, third application 306 and fourth application 308. In various embodiments, the first application 302 is a sensing application, the second application 304 is a perception application, the third application 306 is a localization application and the fourth application 308 is a mapping application. However, this is not meant to be a limitation of the invention.

The first application 302 performed (e.g., the sensing application) obtains intrinsic parameters of the camera prior to performing any calculations. In a first step 310, the processor 110 queries the camera 102 to determine the camera manufacturer and model number. In a second step 312, the processor 110 determines the intrinsic model of the camera 102 based on the information of manufacturer and model number from first step 310. In a third step 314, the processor 110 obtains the intrinsic parameters for the camera manufacturer and model number. In a fourth step 316, the processor 110 determines unified parameters from the intrinsic parameters. In a fifth step 318, the processor 110 performs the operations of the first application (e.g., the sensing operation) using the unified parameters.

The processor 110 can obtain intrinsic parameters and determine unified parameters any time it performs a first application on an image. Once the unified parameters have been determined, they can be stored in memory and retrieved at a later time. For the second application and subsequent applications, the unified parameters can be retrieved without having to query the camera for manufacturer and camera model. Thus, the software architecture is simplified, less computation effort is required and computation times are reduced.

For example, to perform the second application (e.g., perception application 304), the processor 110 performs a first step 320 in which the unified parameters are loaded and a second step 322 in which the operations of the second application (e.g., the perception operation) is performed using the unified parameters. Similarly, to perform the third application (e.g., the localization application 306), the processor 110 performs a first step 324 in which the unified parameters are loaded and a second step 326 in which the operations of the third application (e.g., localization operation) is performed using the unified parameters. Finally, to perform the fourth application (e.g., the mapping application 308), the processor 110 performs a first step 328 in which unified parameters are loaded and a second step 330 in which the operations of the fourth application (e.g., mapping operation) is performed using the unified parameters. It is to be understood that the applications can be performed din any order that an application can be repeated and/or performed twice in succession.

A unified model for image formation at the image plane is shown in Eq. (2):

$$\begin{bmatrix} u \\ v \end{bmatrix} = \overline{K}\overline{g}\left(\begin{bmatrix} x \\ y \\ z \end{bmatrix}, \overline{D}\right) \quad \text{Eq. (2)}$$

where (x, y, z) is the position of a 3D point and (u, v) is the position of a corresponding 2D point in the image plane 202. $\overline{K}$ is a linear transformation of the unified model and $\overline{g}(\ldots)$ is a non-linear transformation of the unified model, which can be a polynomial function or a transformation determined using a neural network. $\overline{D}$ is a vector of distortion parameters $\overline{d}_i$=0, 1, ..., m of the non-linear transformation that describes radial distortion of the image. The linear transformation $\overline{K}$ can be described as a linear matrix such as shown in Eq. (3):

$$\overline{K} = \begin{bmatrix} \overline{f}_x & \overline{s} & \overline{c}_x \\ \overline{e} & \overline{f}_y & \overline{c}_y \end{bmatrix} \quad \text{Eq. (3)}$$

where $\overline{f}_x$ is the x-coordinate of the focal length, $\overline{f}_y$ is the y-coordinate of the focal length, $\overline{s}$ is a skew coefficient, $\overline{c}_x$ is the x-coordinate of the optical center, $\overline{c}_y$ is the y-coordinate of the optical center, and e is a stretch coefficient. The non-linear transformation $\overline{g}(\ldots)$ is shown in Eq. (4):

$$\overline{g}\left(\begin{bmatrix} x \\ y \\ z \end{bmatrix}, \overline{D}\right) = \begin{bmatrix} \frac{x}{\sqrt{x^2+y^2}}\sum_{i=0}^{m} \overline{d}_i \theta^i \\ \frac{y}{\sqrt{x^2+y^2}}\sum_{i=0}^{m} \overline{d}_i \theta^i \\ 1 \end{bmatrix} \quad \text{Eq. (4)}$$

where $$\theta = \tan^{-1}\left(\frac{\sqrt{x^2+y^2}}{z}\right) \quad \text{Eq. (5)}$$

Table 1 shows a set of unified model parameters and their correlation to intrinsic parameters of various exemplary camera models.

TABLE 1

| | Unified | Model 1 | Model 2 | Model 3 | Model 4 | Model 5 |
|---|---|---|---|---|---|---|
| $\overline{K}$ | $\overline{f}_x$ | $f_x$ | $f_x$ | $f_x$ | 1 | 1 |
| | $\overline{f}_y$ | $f_y$ | $f_y$ | 1 | a | a |
| | $\overline{c}_x$ | $c_x$ | $c_x$ | $c_x$ | w/2 + $\sigma_x$ – 1/2 | w/2 + $\sigma_x$ – 1 |
| | $\overline{c}_y$ | $c_y$ | $c_y$ | $c_y$ | h/2 + $\sigma_y$ – 1/2 | h/2 + $\sigma_y$ – 1 |
| | $\overline{s}$ | s | s | s | 0 | 0 |
| | $\overline{e}$ | 0 | 0 | e | 0 | 0 |
| $\overline{D}$ | $\overline{d}_0$ | 0 | n.a. | n.a. | 0 | 0 |
| | $\overline{d}_1$ | 1 | n.a. | n.a. | $d_1$ | $d_1$ |
| | $\overline{d}_2$ | 0 | n.a. | n.a. | $d_2$ | $d_2$ |
| | $\overline{d}_3$ | $d_1$ | n.a. | n.a. | $d_3$ | $d_3$ |
| | $\overline{d}_4$ | 0 | n.a. | n.a. | $d_4$ | $d_4$ |
| | $\overline{d}_5$ | $d_2$ | n.a. | n.a. | 0 | $d_3$ |
| | $\overline{d}_6$ | 0 | n.a. | n.a. | 0 | $d_4$ |
| | $\overline{d}_7$ | $d_3$ | n.a. | n.a. | 0 | 0 |
| | $\overline{d}_8$ | 0 | n.a. | n.a. | 0 | 0 |
| | $\overline{d}_9$ | $d_4$ | n.a. | n.a. | 0 | 0 |

One method to determine a unified parameter is to use analytical calculations using the manufacturer-provided intrinsic parameters. For example, in Table 1, $\overline{K}$ of models 1, 2, 3, 4, and 5, and $\overline{D}$ of models 1, 4, and 5 are determined using analytical calculations. The explicit equations to calculate each of these parameters are analytically derived and shown in Table 1. The n.a. entries for Model 2 and Model 3 may not be available using analytical calculations from the manufacturer provided intrinsic parameters and therefore can be determined using the methods discussed herein with respect to FIGS. 4 and 5.

Figure 4:
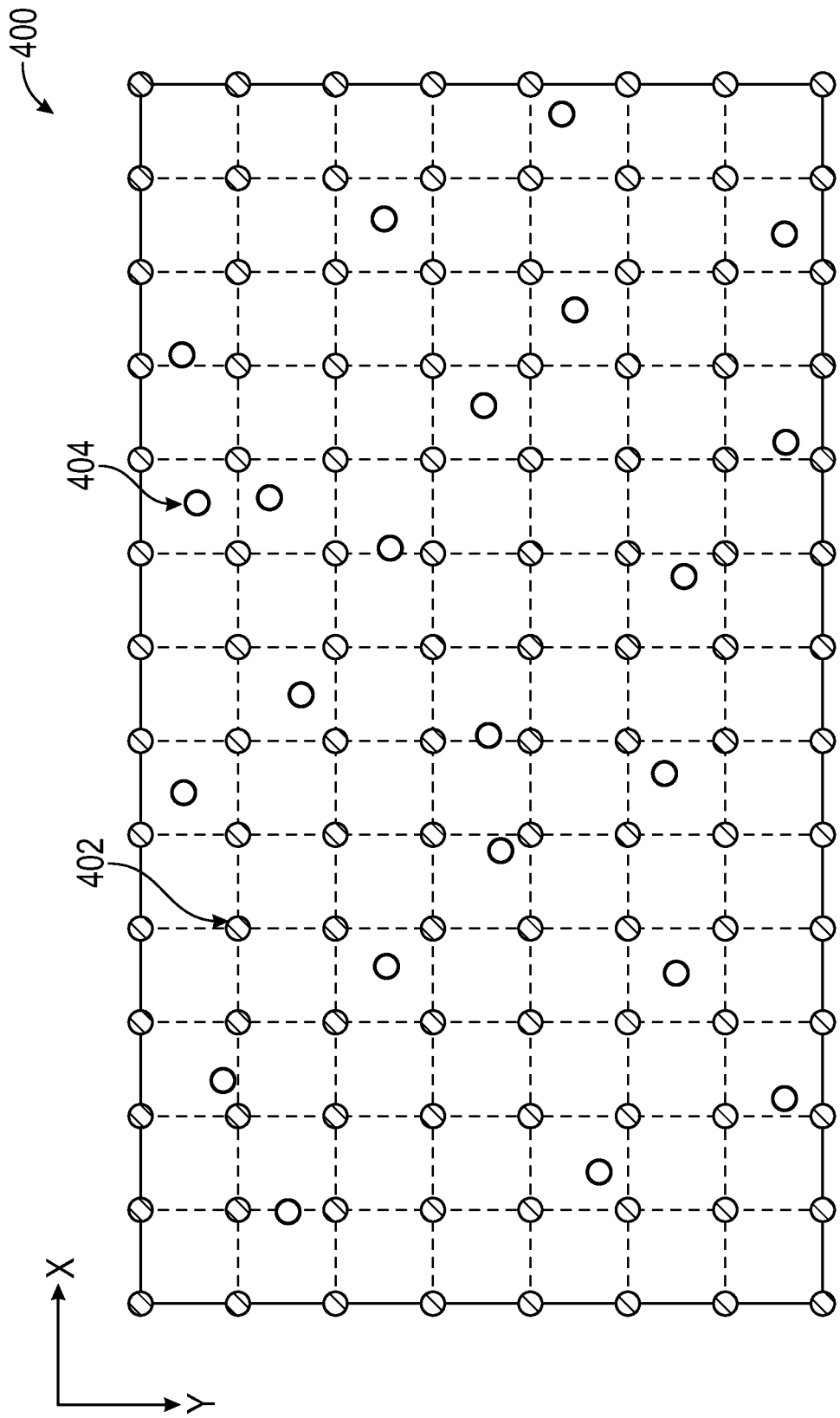
FIG. 4 shows a grid that can be used to determine a unified parameter from the intrinsic parameter of the camera, in an illustrative embodiment.

FIG. 4 shows a grid 400 that can be used to determine a unified parameter from the intrinsic parameter of the camera, in an illustrative embodiment. The grid 400 includes a first set of points 402 which are predetermined or preselected points and a second set of points 404 which are randomly sampled points. The points of the grid 400 are transformed into the image plane using the intrinsic parameters of the camera to obtain a first set of projected points (u', v', 1) in the image plane 202 and using the unified parameters of the unified model to obtain a second set of projected points (u", v", 1) in the image plane 202. An optimization process is then performed to change the unified parameters of the unified model in way that reduces a difference between first set of projected points and the second set of projected points to either at a minimum value or to a value within given criterion. The difference is a Euclidean distance between points in the image plane.

Figure 5:
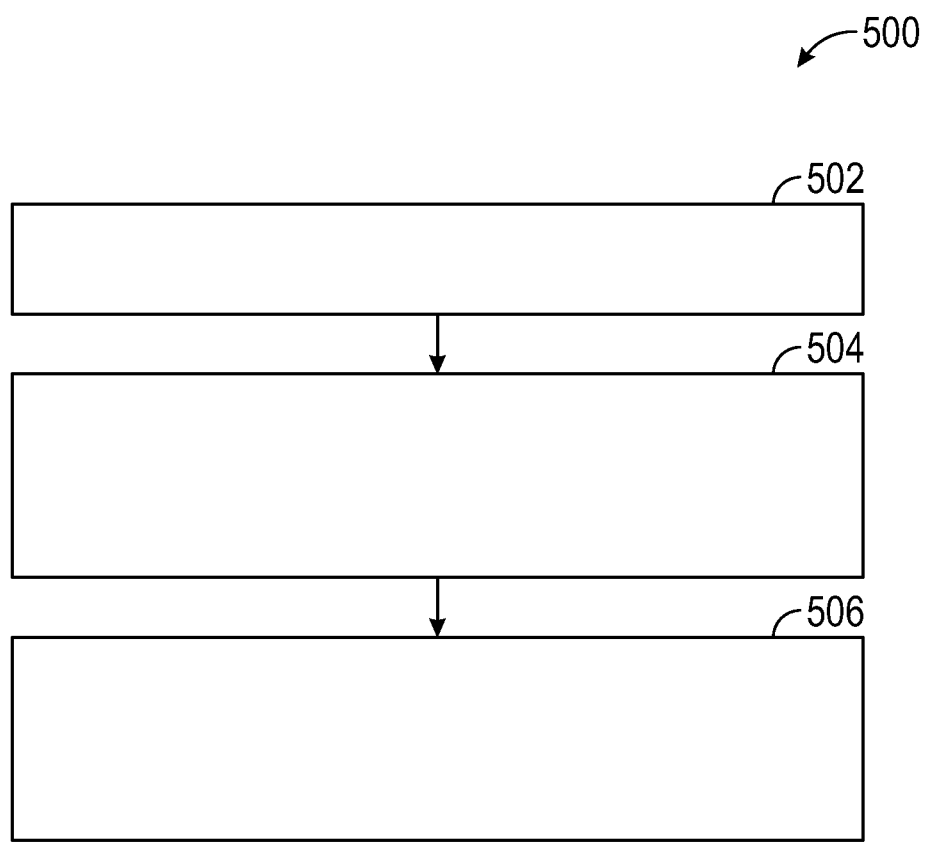
FIG. 5 shows a flowchart of a method for determining unified parameters of the unified model.

FIG. 5 shows a flowchart 500 of a method for determining unified parameters of the unified model. In box 502, a virtual three-dimensional grid of points are defined including at least one predetermined point from the first set of points 402 and at least one randomly sampled point from the second set of points 404. In box 504, a first set of projected points [u', v'] are projected into the image plane using the intrinsic parameters of the camera and a second set of projected points [u", v"] are projected into the image plane using the unified parameters of the unified model.

In box 506, the unified parameters are modified by solving an optimization of a cost function based on the first set of image points and the second set of image points. An illustrative cost function optimization is shown in Eq. (6):

$$\overline{D}^* = \underset{\overline{D}}{\mathrm{argmin}} \sum_i \left\| \begin{bmatrix} u'_i \\ v'_i \\ 1 \end{bmatrix} - \overline{g}(P_i, \overline{D}) \right\| \qquad \text{Eq. (6)}$$

where $[u'_i \; v'_i \; 1]^T$ is the first set of projected points (formed using the intrinsic parameters of the camera, $\overline{g}(\ldots)$ is the second set of projected points (formed using the unified model) and vector $\overline{D}^*$ is the optimal coefficients of the unified model obtained through the optimization process. The optimal coefficients are stored in memory and retrieved for subsequent use in applications.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a camera for a vehicle, comprising:
   querying the camera to obtain an intrinsic parameter of the camera;
   estimating a unified parameter based on the intrinsic parameter of the camera, wherein the unified parameter is determined using a linear transformation of a unified model for the camera and a non-linear transformation of the unified model, wherein the non-linear transformation is a polynomial function that determines a distortion by the camera of a three-dimensional field of points onto a two-dimensional image plane, wherein the polynomial function is determined using a neural network; and
   performing at least one application on an image from the camera using the unified parameter.

2. The method of claim 1, further comprising storing the unified parameter to a memory and performing the same or a different application by retrieving the unified parameter from the memory.

3. The method of claim 1, wherein estimating the unified parameter further comprises determining a distortion model for the camera.

4. The method of claim 1, further comprising determining the unified parameter from the intrinsic parameter using an analytical calculation.

5. The method of claim 1, wherein determining the unified parameter includes:
   projecting a virtual three-dimensional grid of points onto an image plane of the camera using the intrinsic parameter to form a first set of projected points in the image plane;
   projecting the virtual three-dimensional grid of points onto the image plane using the unified parameter to form a second set of projected points in the image plane; and
   modifying the unified parameter to reduce a difference between the first set of projected points and the second set of projected points to.

6. The method of claim 5, wherein determining the coefficient further comprises minimizing a cost function between the first set of projected points and the second set of projected points.

7. The method of claim 5, wherein the virtual three-dimensional grid of points includes a predetermined point and a randomly sampled point.

8. A system for operating a camera of a vehicle, comprising:
   an imaging plane of the camera;
   a processor configured to:
      query the camera to obtain an intrinsic parameter of the camera;
      estimate a unified parameter based on the intrinsic parameter of the camera, wherein the unified parameter is determined by projecting a three-dimensional point into the image plane using a linear transformation of a unified model for the camera and projecting the three-dimensional point into the image plane using a non-linear transformation of the unified model, wherein the non-linear transformation is a polynomial function that determines a distortion by the camera of a three-dimensional field of points onto a two-dimensional image plane, wherein the polynomial function is determined using a neural network; and
      perform at least one application on an image from the camera using the unified parameter.

9. The system of claim 8, wherein the processor is further configured to store the unified parameter to a memory and retrieve the unified parameter from the memory to perform the same or a different application.

10. The system of claim 8, wherein the processor is further configured to estimate the unified parameter by determining a distortion model for the camera.

11. The system of claim 8, wherein the processor is further configured to determine the unified parameter from the intrinsic parameter using an analytical calculation.

12. The system of claim 8, wherein the processor is further configured to determine the unified parameter by:
   projecting a virtual three-dimensional grid of points onto an image plane using the intrinsic parameter to form a first set of projected points in the image plane;
   projecting the virtual three-dimensional grid of points onto the image plane using the unified parameter to form a second set of projected points in the image plane; and
   determining a coefficient of a distortion model that reduces a difference between the first set of projected points and the second set of projected points.

13. The system of claim 12, wherein the processor is further configured to determine the coefficient by minimizing a cost function between the first set of projected points and the second set of projected points.

14. The system of claim 12, wherein the virtual three-dimensional grid of points includes a predetermined point and a randomly sampled point.

15. A vehicle, comprising:
   a camera configured to capture an image;
   an actuation system; and
   a processor configured to:
      query the camera to obtain an intrinsic parameter of the camera;
      estimate a unified parameter based on the intrinsic parameter of the camera, wherein the unified parameter is determined using a linear transformation of a unified model for the camera and a non-linear transformation of the unified model, wherein the non-linear transformation is a polynomial function that determines a distortion by the camera of a three-dimensional field of points onto a two-dimensional image plane, wherein the polynomial is determined using a neural network; and perform at least one application on the image using the unified parameter to detect an object in the image, wherein the actuation controls movement of the vehicle with respect to the object.

16. The vehicle of claim 15, further comprising a memory, wherein the processor is further configured to store the unified parameter to the memory and retrieve the unified parameter from the memory to perform the same or a different application.

17. The vehicle of claim 15, wherein the processor is further configured to estimate the unified parameter from the intrinsic parameter using an analytical calculation.

18. The vehicle of claim 15, wherein the processor is further configured to determine the unified parameter by:

projecting a virtual three-dimensional grid of points onto an image plane using the intrinsic parameter to form a first set of projected points in the image plane;

projecting the virtual three-dimensional grid of points onto the image plane using the unified parameter to form a second set of projected points in the image plane; and determining a coefficient of a distortion model that reduces a difference between the first set of projected points and the second set of projected points.

19. The vehicle of claim 18, wherein the processor is further configured to determine the coefficient by minimizing a cost function between the first set of projected points and the second set of projected points.

20. The vehicle of claim 18, wherein the virtual three-dimensional grid of points includes a predetermined point and a randomly sampled point.

\* \* \* \* \*